(12) United States Patent
Huang et al.

(10) Patent No.: US 8,817,006 B2
(45) Date of Patent: *Aug. 26, 2014

(54) ADAPTER

(75) Inventors: Szu-Lun Huang, New Taipei (TW); Chih-Huang Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 157 days.

This patent is subject to a terminal disclaimer.

(21) Appl. No.: 13/442,945

(22) Filed: Apr. 10, 2012

(65) Prior Publication Data

US 2013/0162615 A1     Jun. 27, 2013

(30) Foreign Application Priority Data

Dec. 23, 2011   (TW) .................................. 100148480

(51) Int. Cl.
*G06F 3/038*   (2013.01)
*G09G 5/10*   (2006.01)

(52) U.S. Cl.
USPC .......................................... 345/211; 345/690

(58) Field of Classification Search
USPC ......... 345/211, 212, 213, 174, 204, 206, 207, 345/620
See application file for complete search history.

(56) References Cited

U.S. PATENT DOCUMENTS

2007/0139558 A1*   6/2007   Reineke ...................... 348/571

\* cited by examiner

*Primary Examiner* — Michael Faragalla
(74) *Attorney, Agent, or Firm* — Novak Druce Connolly Bove + Quigg LLP

(57) ABSTRACT

A display adapter includes first and second conversion circuits, a switch unit, and a video graphics array (VGA) interface. The first conversion circuit includes a digital to analog (D/A) converter and a coupler. The second conversion circuit includes an analog to digital (A/D) converter and a decoupler. When the switch unit connects the first conversion circuit to the VGA interface, the D/A converter converts a digital signals representing VGA data into a first analog form data for coupling with a first alternating current (AC) voltage. When the switch unit connects the second conversion circuit to the VGA interface, the decoupler decouples and separates a second analog form data into the second analog form data. The A/D converter converts the second analog form data into digital signals representing VGA data, and outputs the digital signals representing VGA data to the VGA interface for use by another VGA display device.

5 Claims, 5 Drawing Sheets

ADAPTER

CROSS-REFERENCE TO RELATED APPLICATIONS

Relevant subject matter is disclosed in the co-pending U.S. patent application Ser. Nos. 13/442,937, 13/442,953, 13/442,956, 13/442,959, 13/442,965, 13/442,970, 13/442,977, 13/442,981, 13/442,988, and 13/442,994 having the same title and assigned to the same assignee as named herein.

TECHNICAL FIELD

The present disclosure relates to adapters, and particularly, to a display adapter.

DESCRIPTION OF RELATED ART

If media such as videos in a first room are shared to other displays in a second room, a conversion device needs to be connected between the displays in the first and second rooms through cables. This is troublesome, untidy, and inconvenient.

BRIEF DESCRIPTION OF THE DRAWINGS

Many aspects of the present embodiments can be better understood with reference to the following drawings. The components in the drawing are not necessarily drawn to scale, the emphasis instead being placed upon clearly illustrating the principles of the present disclosure. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Figure 1:
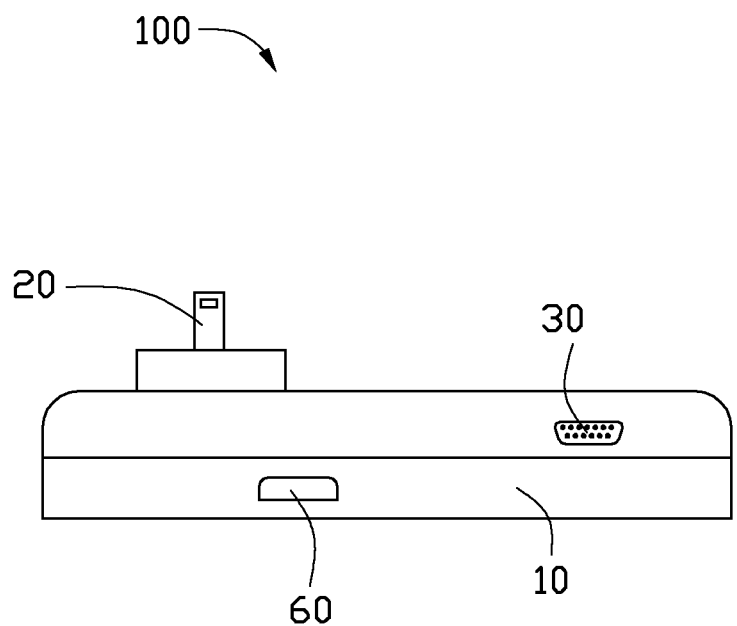
FIG. 1 is a schematic view of an exemplary embodiment of a display adapter, wherein the display adapter includes a voltage conversion circuit.
Figure 2:
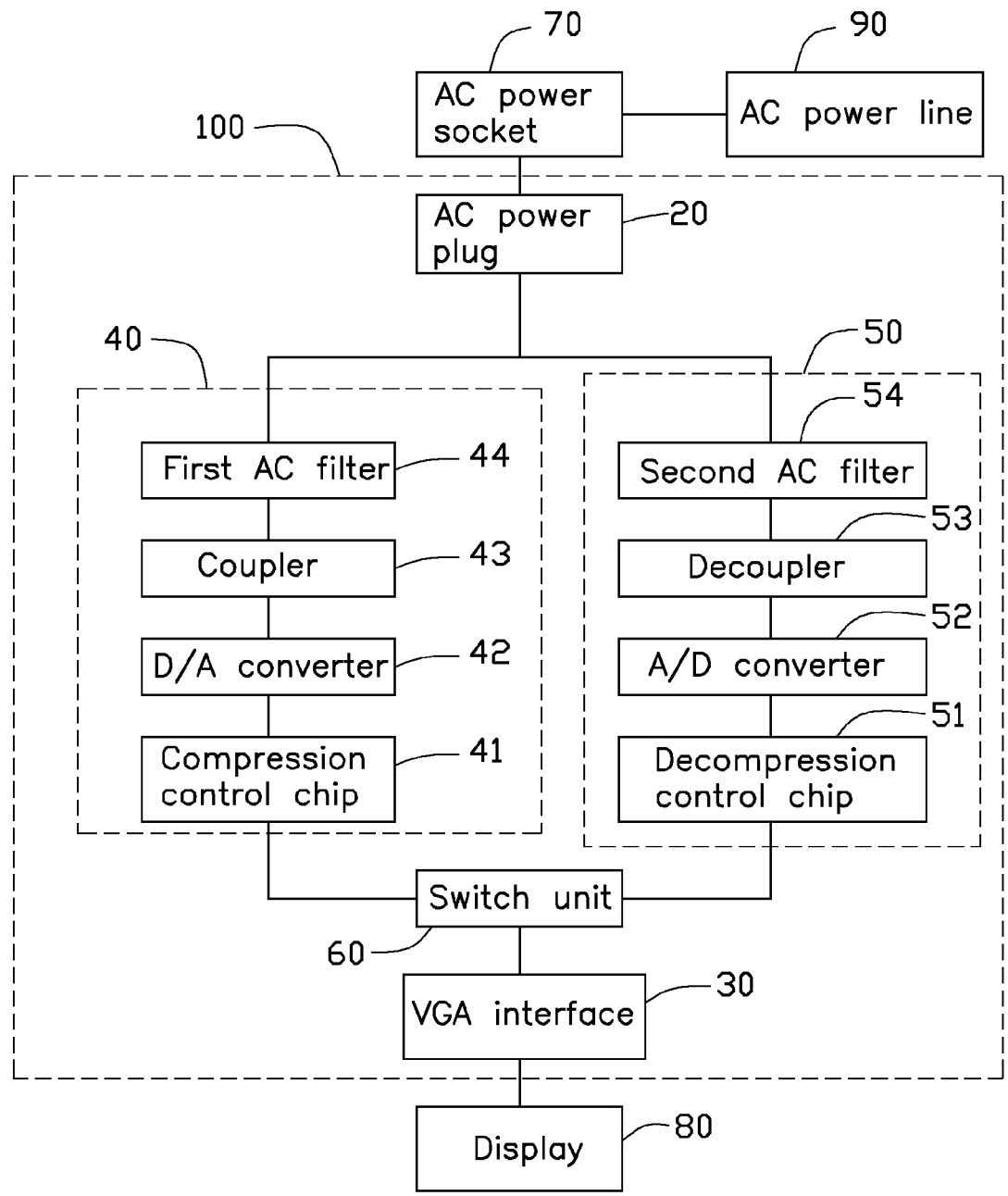
FIG. 2 is a block diagram of the display adapter of FIG. 1.
Figure 3:
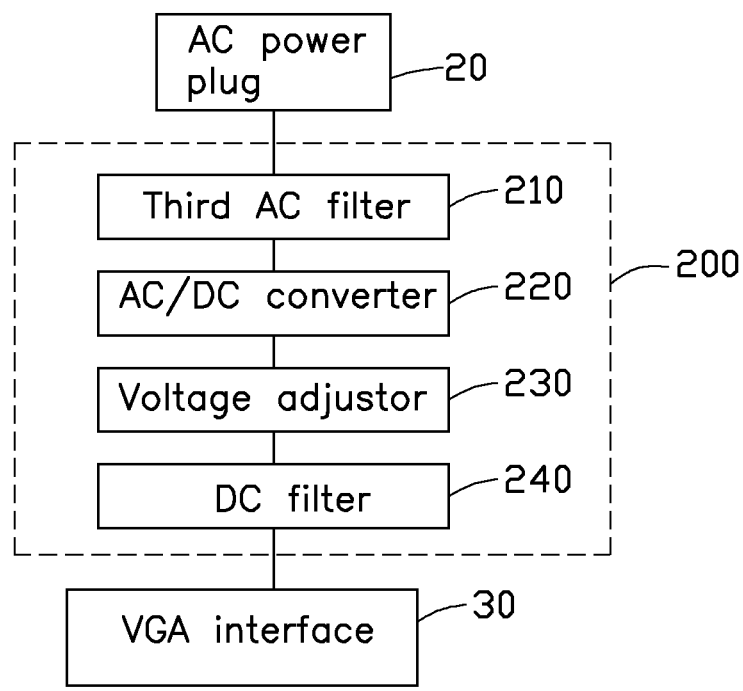
FIG. 3 is a block diagram of the voltage conversion circuit of FIG. 1.

Referring to FIGS. 1 to 3, an embodiment of a display adapter 100 includes an enclosure 10, an alternating current (AC) power plug 20, a video graphics array (VGA) interface 30, a first conversion circuit 40, a second conversion circuit 50, a switch unit 60, and a voltage conversion circuit 200. The AC power plug 20 is mounted on the enclosure 10 to be connected to an AC power socket 70. The VGA interface 30 is mounted on the enclosure 10 to be connected to a display 80. The switch unit 60 is connected between the VGA interface 30 and each of the first and second conversion circuits 40 and 50, to connect either the first conversion circuit 40 or the second conversion circuit 50 to the VGA interface 30. When the display 80 which is connected to the display adapter 100 functions as a signal transmission terminal, the switch unit 60 connects the first conversion circuit 40 to the VGA interface 30. When the display 80 which is connected to the display adapter 100 functions as a signal receiving terminal, the switch unit 60 connects the second conversion circuit 50 to the VGA interface 30. In the embodiment, the switch unit 60 is a manual switch.

The first conversion circuit 40 includes a compression control chip 41, a digital to analog (D/A) converter 42, a coupler 43, and a first AC filter 44. The second conversion circuit 50 includes a decompression control chip 51, an analog to digital (A/D) converter 52, a decoupler 53, and a second AC filter 54.

The compression control chip 41 is connected to the switch unit 60. The D/A converter 42 is connected between the compression control chip 41 and the coupler 43. The coupler 43 is connected to the AC power plug 20 through the first AC filter 44. The AC power plug 20 is also connected to the decoupler 53 through the second AC filter 54. The A/D converter 52 is connected between the decoupler 53 and the decompression control chip 51. The decompression control chip 51 is connected to the switch unit 60.

The voltage conversion circuit 200 includes a third AC filter 210, an alternating current to direct current (AC/DC) converter 220, a voltage adjustor 230, and a DC filter 240. In view of the likelihood of random noise in the AC voltage, the third AC filter 210 is connected to the AC power plug 20 to receive the AC voltage, and filters the noise from the AC voltage. The AC/DC converter 220 is connected between the third AC power filter 210 and the voltage adjustor 230, to convert the AC voltage into a DC voltage, and outputs the DC voltage to the voltage adjustor 230. The voltage adjustor 230 adjusts the received DC voltage. In view of the possibility of random noise in the adjusted DC voltage, the DC filter 240 is connected between the voltage adjustor 230 and the VGA interface 30 to filter the noise from the adjusted DC voltage and output the filtered DC voltage to the VGA interface 30, to power the display 80 connected to the VGA interface 30.

Figure 4:
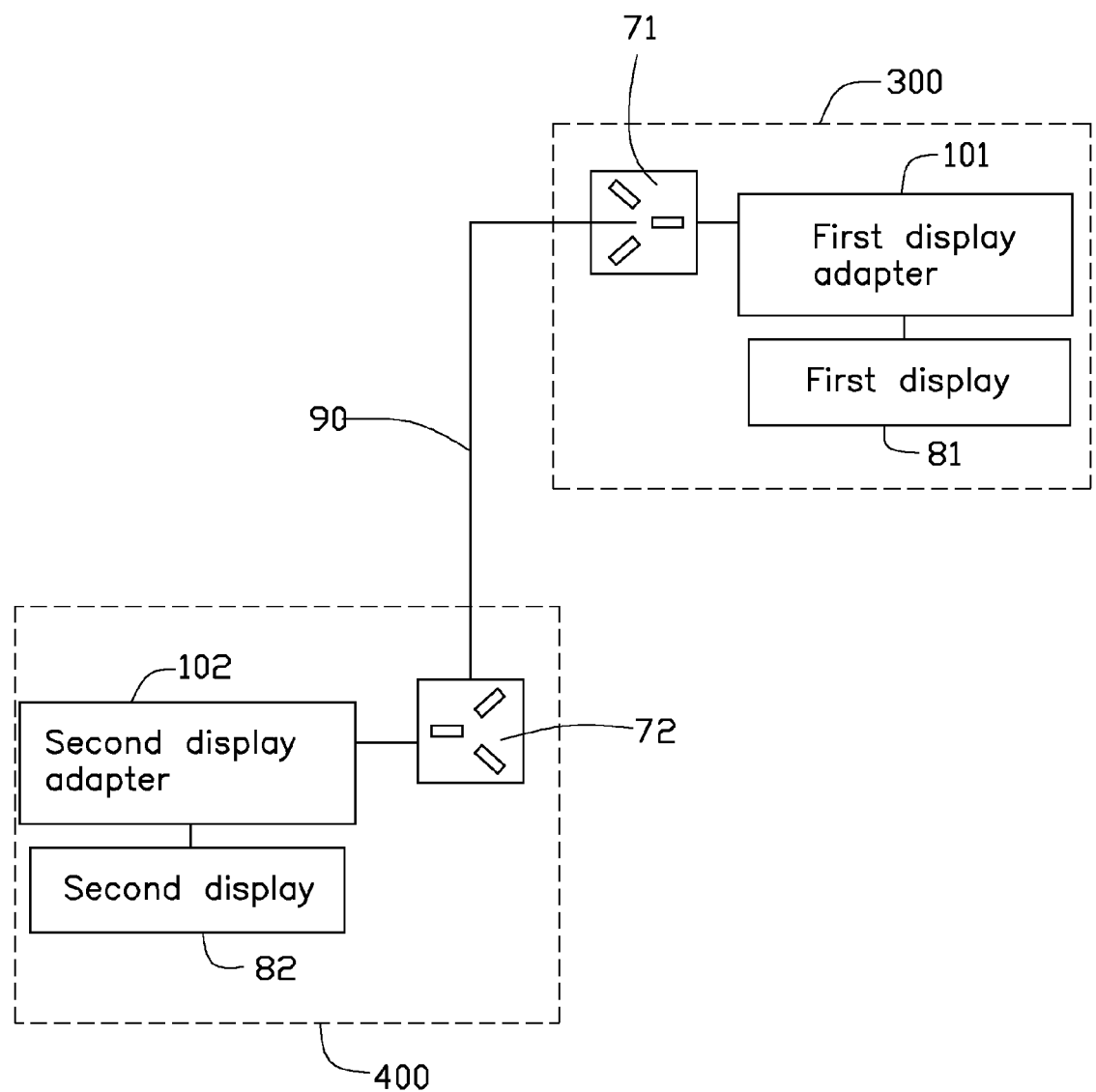
FIG. 4 is a schematic view of the display adapter communicating with another display adapter.
Figure 5:
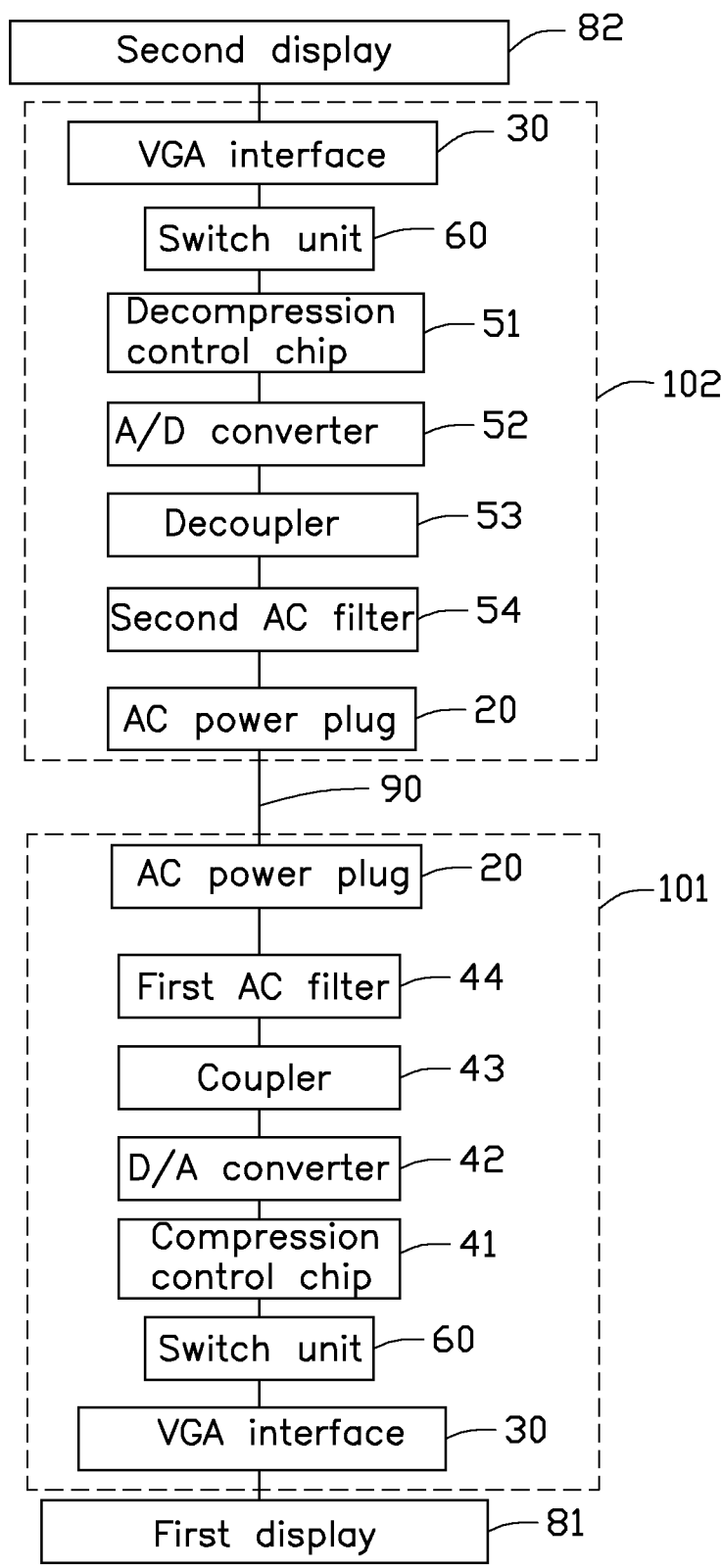
FIG. 5 is a block diagram of the systems of FIG. 4.

Referring to FIGS. 4 and 5, an example describes a working principle of the display adapter 100. A first display adapter 101 is inserted into a first AC power socket 71 in a first room 300. A second display adapter 102 is inserted into a second AC power socket 72 in a second room 400. The first AC power socket 71 is connected to the second AC power socket 72 through a commercial AC power line 90. The first and second display adapters 101 and 102 have the same function and structure as the above-mentioned display adapter 100. A first display 81 is connected to the VGA interface 30 of the first display adapter 101 in the first room 300. A second display 82 is connected to the VGA interface 30 of the second display adapter 102 in the second room 400.

When the first display 81 in the first room 300 functioning as a signal transmission terminal communicates with the second display 82 in the second room 400 functioning as a signal receiving terminal, the switch unit 60 of the first display adapter 101 is switched to connect the first conversion circuit 40 to the VGA interface 30 of the first display adapter 101, and the switch unit 60 of the second display adapter 102 is switched to connect the second conversion circuit 50 to the VGA interface 30 of the second display adapter 102.

The first display 81 outputs a digital signal representing VGA data to the VGA interface 30 of the first display adapter 101. The compression control chip 41 receives the digital signal representing VGA data through the switch unit 60, compresses the digital signal representing VGA data into one or more data packets, and outputs the one or more data packets to the D/A converter 42. The D/A converter 42 converts the one or more data packets into an analog form (analog form data) suitable for transmission over an AC voltage which functions as a carrier wave, and outputs the analog form data to the coupler 43. The coupler 43 couples the analog form data to an AC voltage and outputs the AC voltage coupled with the analog form data to the first AC power socket 71. The first AC filter 44 filters the noise from the AC voltage coupled with the analog form data, and outputs the AC voltage coupled with the analog form data to the AC power line 90 through the AC power plug 20 and the AC power socket 71.

The AC power line 90 transmits the AC voltage coupled with the analog form data to the second AC filter 54 through the AC power socket 72 and the second power plug 20 in the second room 400. The second filter 54 filters any noise from the AC voltage coupled with the analog form data, and outputs the filtered AC voltage coupled with the analog form data to the decoupler 53. The decoupler 53 decouples and separates the AC voltage coupled with the analog form data e into the AC voltage and the analog form data, and outputs the analog form data to the A/D converter 52. The A/D converter 52 converts the analog form data into the one or more data packets, and outputs the one or more data packets to the decompression control chip 51 of the second display adapter 102. The decompression control chip 51 decompresses the data packet into the digital signals representing VGA data, and outputs the digital signals representing VGA data to the second display 82 through the switch unit 60 and the VGA interface 30 in the second room 400. Therefore, the first display 101 in the first room 300 and the second display 102 in the second room 400 can freely share VGA data through any commercial AC power line 90.

Although numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A display adapter, comprising:
   an alternating current (AC) power plug to be inserted into an AC power socket to receive a first AC voltage;
   a video graphics array (VGA) interface to be connected to a display;
   a first conversion circuit comprising a digital to analog (D/A) converter, and a coupler connected between the D/A converter and the AC power plug;
   a second conversion circuit comprising an analog to digital (A/D) converter, and a decoupler connected between the A/D converter and the AC power plug; and
   a switch unit connected between the VGA interface and each of the first conversion circuit and the second conversion circuit, to connect either the first conversion circuit or the second conversion circuit to the VGA interface;
   wherein when the switch unit connects the first conversion circuit to the VGA interface, the D/A converter receives a first digital signal representing VGA data output by the display through the VGA interface, and converts the first digital signal representing VGA data into a first analog form data, the coupler couples the first analog form data to the first AC voltage, and outputs the first AC voltage coupled with the first analog form data to the AC power plug, the AC power plug transmits the first AC voltage coupled with the first analog form data to an AC power line connected to the AC power socket; and
   wherein when the switch unit connects the second conversion circuit to the VGA interface, the decoupler receives a second AC voltage coupled with a second analog form data through the AC power plug from the AC power line connected to the AC power socket, decouples and separates the second AC voltage coupled with the second analog form data into the second AC voltage and the second analog form data, and outputs the second analog form data to the A/D converter, the A/D converter converts the second analog form data into a second digital signal representing VGA data, and outputs the second digital signal representing VGA data to the display through the VGA interface.

2. The display adapter of claim 1, wherein the first conversion circuit further comprises a compression control chip, the compression control chip is connected between the switch unit and the D/A converter to receive the first digital signal representing VGA data from the display through the VGA interface, compresses the first digital signal representing VGA data into a first data packet, and outputs the first data packet to the D/A converter, the D/A converter converts the first data packet into the first analog form data; wherein the second conversion circuit further comprises a decompression control chip, the decompression control chip is connected between the switch unit and the A/D converter to receive a second data packet from the AC power line and decompress the second data packet into the second digital signal representing VGA data, and outputs the second digital signal representing VGA data to the VGA interface through the switch unit.

3. The display adapter of claim 1, wherein the first conversion circuit further comprises an AC filter, the AC filter is connected between the coupler and the AC power plug to filter the first AC voltage coupled with the first analog form data output to the AC power line.

4. The display adapter of claim 1, wherein the second conversion circuit further comprises an AC filter, the AC filter is connected between the decoupler and the AC power plug to filter the second AC voltage coupled with the second analog form data from the AC power line.

5. The display adapter of claim 4, further comprising a voltage conversion circuit, wherein the voltage conversion circuit comprises an alternating current to direct current (AC/DC) converter and a voltage adjustor, the AC/DC converter is connected between the AC power plug and the voltage adjustor to receive the first AC voltage, converts the first AC voltage into a DC voltage, and outputs the DC voltage to the voltage adjustor, the voltage adjustor adjusts the received DC voltage, and outputs the adjusted DC voltage to the VGA interface to power the display.

* * * * *